US011123867B2

(12) United States Patent
Diaz et al.

(10) Patent No.: US 11,123,867 B2
(45) Date of Patent: Sep. 21, 2021

(54) AUTOMATED RADAR ASSEMBLY SYSTEM

(71) Applicant: Raytheon Company, Waltham, MA (US)

(72) Inventors: Jayson Diaz, Melrose, MA (US); David A. Miceli, Groton, MA (US); William J. Murphy, Waltham, MA (US); Nicholas Stangas, Tewksbury, MA (US)

(73) Assignee: Raytheon Company, Waltham, MA (US)

( * ) Notice: Subject to any disclaimer, the term of this patent is extended or adjusted under 35 U.S.C. 154(b) by 183 days.

(21) Appl. No.: 16/411,034

(22) Filed: May 13, 2019

(65) Prior Publication Data

US 2020/0361088 A1 Nov. 19, 2020

(51) Int. Cl.
*G05B 19/418* (2006.01)
*B25J 9/16* (2006.01)
(Continued)

(52) U.S. Cl.
CPC .......... *B25J 9/1664* (2013.01); *B25J 9/0084* (2013.01); *B25J 11/005* (2013.01); *B25J 13/06* (2013.01); *G01S 7/02* (2013.01)

(58) Field of Classification Search
CPC ........ B25J 11/005; B25J 13/06; B25J 9/0084; B25J 9/1664; B25J 9/06; G01S 7/02; G01S 13/02; G01S 2007/027; G01S 2013/0254
See application file for complete search history.

(56) References Cited

U.S. PATENT DOCUMENTS 8,954,183 B2 * 2/2015 Kayani .................. B23K 26/03
700/114
10,745,251 B2 * 8/2020 Miller ................... B66C 19/005
(Continued)

FOREIGN PATENT DOCUMENTS

DE     202015 104886 U1   1/2017
EP          0115728 A1    8/1984
WO    WO 2015/017064 A1   2/2015

OTHER PUBLICATIONS

Notification of Transmittal of the International Search Report and Written Opinion of the International Searching Authority, or the Declaration, PCT/US2020/022297, dated Jun. 16, 2020, 1 page.
(Continued)

*Primary Examiner* — Harry Y Oh
(74) *Attorney, Agent, or Firm* — Daly, Crowley, Mofford and Durkee, LLC

(57) ABSTRACT

An automated radar assembly system is disclosed, comprising: a first robotic device coupled to a cradle, the first robotic device having a first working envelope; a second robotic device coupled to the first robotic device via the cradle, the second robotic device having a second working envelope that is smaller than the first working envelope; a part stand coupled to the cradle, the part stand being arranged to carry: a part; and a controller operatively coupled to the first robotic device and the second robotic device, the controller being configured to: cause the first robotic device to position the second robotic device at a first location relative to a radar array chassis, and cause the second robotic device to pick up the part from the part stand and install the part at a second location in the radar array chassis.

14 Claims, 14 Drawing Sheets

(51) Int. Cl.
*B25J 9/00* (2006.01)
*B25J 11/00* (2006.01)
*B25J 13/06* (2006.01)
*G01S 7/02* (2006.01)

(56) References Cited

U.S. PATENT DOCUMENTS

| | | | |
|---|---|---|---|
| 10,926,407 B2* | 2/2021 | Ayyagari | B64F 5/10 |
| 2013/0042480 A1* | 2/2013 | Turulin | B27F 7/155 |
| | | | 29/897.312 |
| 2016/0011593 A1* | 1/2016 | Oberoi | F16B 19/06 |
| | | | 701/23 |
| 2017/0203441 A1* | 7/2017 | Nelson | B25J 11/005 |
| 2018/0345354 A1* | 12/2018 | Eusterwiemann | B21J 15/32 |
| 2019/0027835 A1* | 1/2019 | Hoyt | H01Q 3/46 |
| 2019/0054624 A1* | 2/2019 | Stoy | B25J 9/1679 |
| 2020/0061823 A1* | 2/2020 | Nguyen | G05D 1/0214 |

OTHER PUBLICATIONS

International Search Report, PCT/US2020/022297, dated Jun. 16, 2020, 4 pages.
Written Opinion of the International Searching Authority, PCT/US2020/022297, dated Jun. 16, 2020, 13 pages.

* cited by examiner

AUTOMATED RADAR ASSEMBLY SYSTEM

BACKGROUND

Large-scale modular radars use radio waves to determine the range, angle or velocity of objects. The manual assembly of large-scale modular radars is a labor-intensive process which takes months to complete. More particularly, the manual assembly of large-scale modular radars depends on the use of manual processes and tooling to perform high torque operations inside a radar structure. Such operations may require operators to work in hard-to-reach locations, and they may be difficult to complete manually.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to aspects of the disclosure, an automated radar assembly system is disclosed, comprising: a first robotic device coupled to a cradle, the first robotic device having a first working envelope; a second robotic device mechanically coupled to the first robotic device via the cradle, the second robotic device having a second working envelope that is smaller than the first working envelope; a part stand coupled to the cradle, the part stand being arranged to carry: (i) a part and (ii) one or more fasteners for installing the part in a radar array chassis; and a controller operatively coupled to the first robotic device and the second robotic device, the controller being configured to: cause the first robotic device to position the second robotic device at a first location relative to the radar array chassis, and cause the second robotic device to pick up the part from the part stand and install the part at a second location in the radar array chassis.

According to aspects of the disclosure, an automated assembly system is disclosed, comprising: a first robotic device coupled to a cradle, the first robotic device having a first working envelope; a second robotic device mechanically coupled to the first robotic device via the cradle, the second robotic device having a second working envelope that is smaller than the first working envelope; a controller operatively coupled to the first robotic device and the second robotic device the controller being configured to: receive a user input requesting a part to be installed in a structure under assembly, cause the first robotic device to position the second robotic device at a first location relative to the structure under assembly, and cause the second robotic device to install the part at a second location in the structure under assembly.

According to aspects of the disclosure, an automated assembly system, comprising: a first robotic device coupled to a cradle, the first robotic device having a first working envelope; a second robotic device mechanically coupled to the first robotic device via the cradle, the second robotic device having a second working envelope that is smaller than the first working envelope; a controller operatively coupled to the first robotic device and the second robotic device, the controller being configured to; receive a user input requesting a part to be installed in a structure under assembly; identify a first location where the second robotic device has to be positioned in order for the second robotic device to be able to install the part in the structure under assembly; identify a second location in the structure under assembly where the part is to be installed; transmit, to the first robotic device, a first command, the first command instructing the first robotic device to position the second robotic device at the first location; receive a confirmation from the first robotic device indicating that the second robotic device has been positioned at the first location; and transmit a second command to the second robotic device, the second command instructing the second robotic device to install the part at the second location in the structure under assembly.

BRIEF DESCRIPTION OF THE DRAWING FIGURES

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

DETAILED DESCRIPTION

Figure 1A:
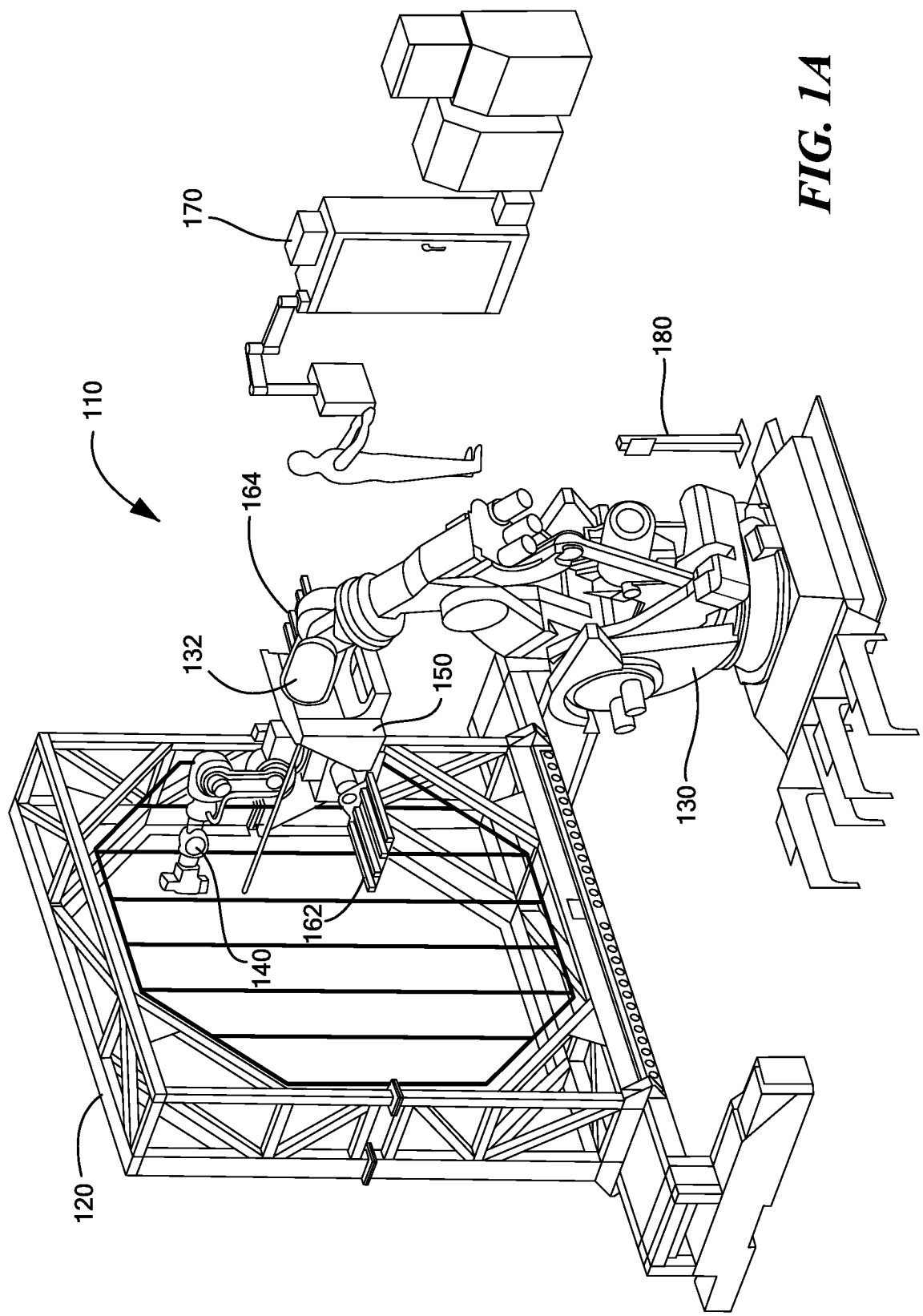
FIG. 1A is a perspective side view of an automated assembly system, according to aspects of the disclosure.
Figure 1B:
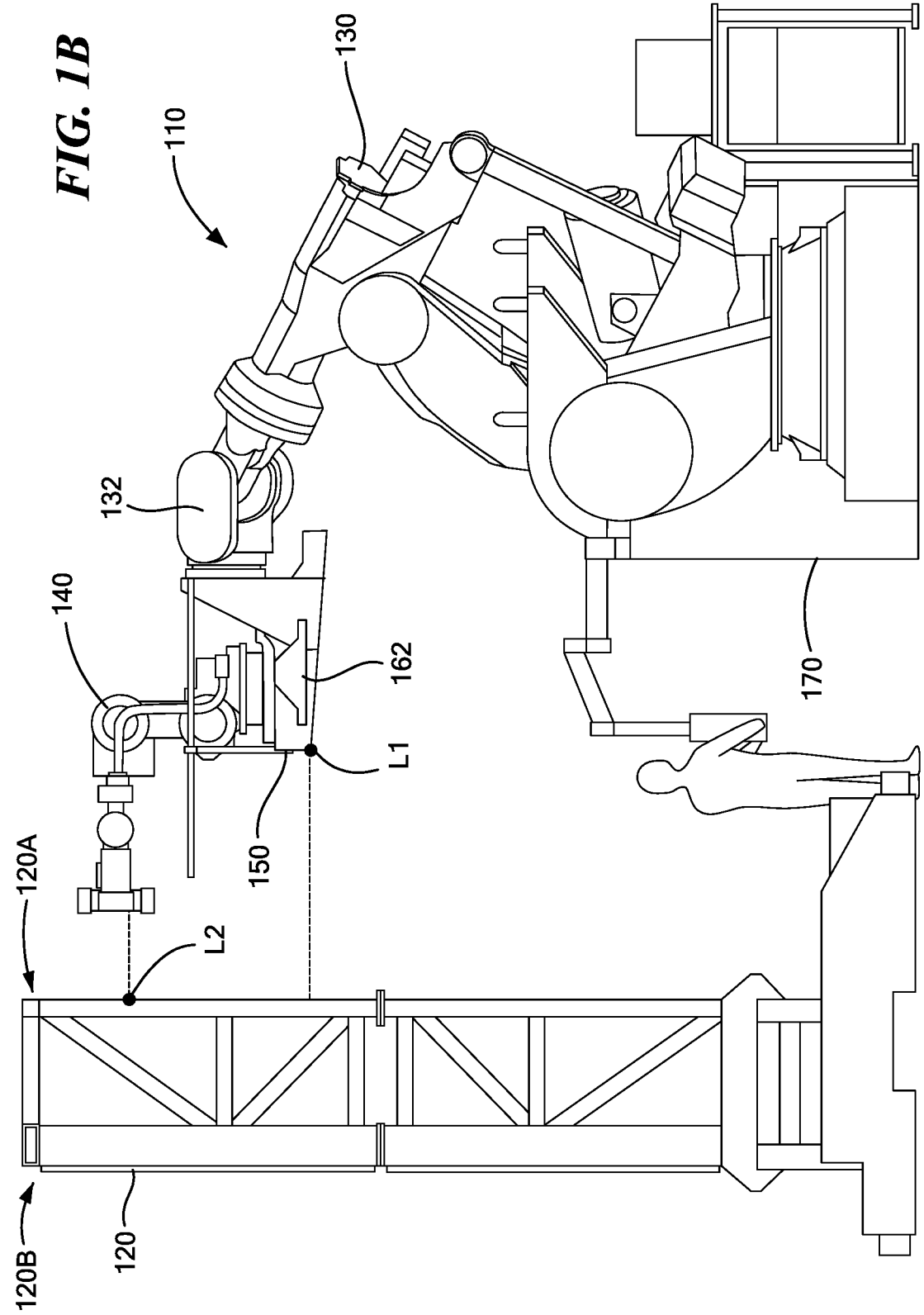
FIG. 1B is a planar side view of the automated assembly system of FIG. 1A, according to aspects of the disclosure.
Figure 1C:
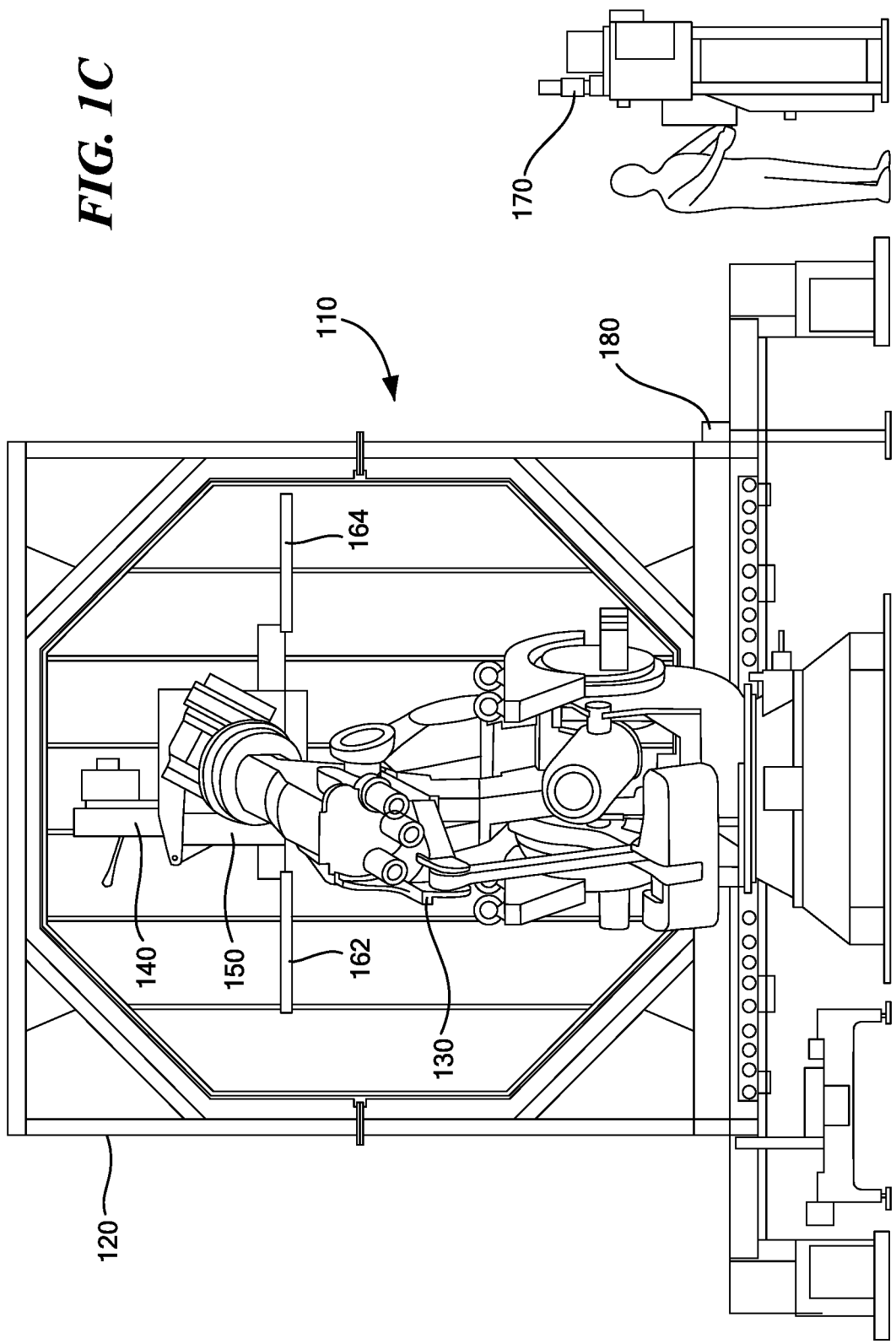
FIG. 1C is a planar side view of the automated assembly system of FIG. 1A, according to aspects of the disclosure.
Figure 1D:
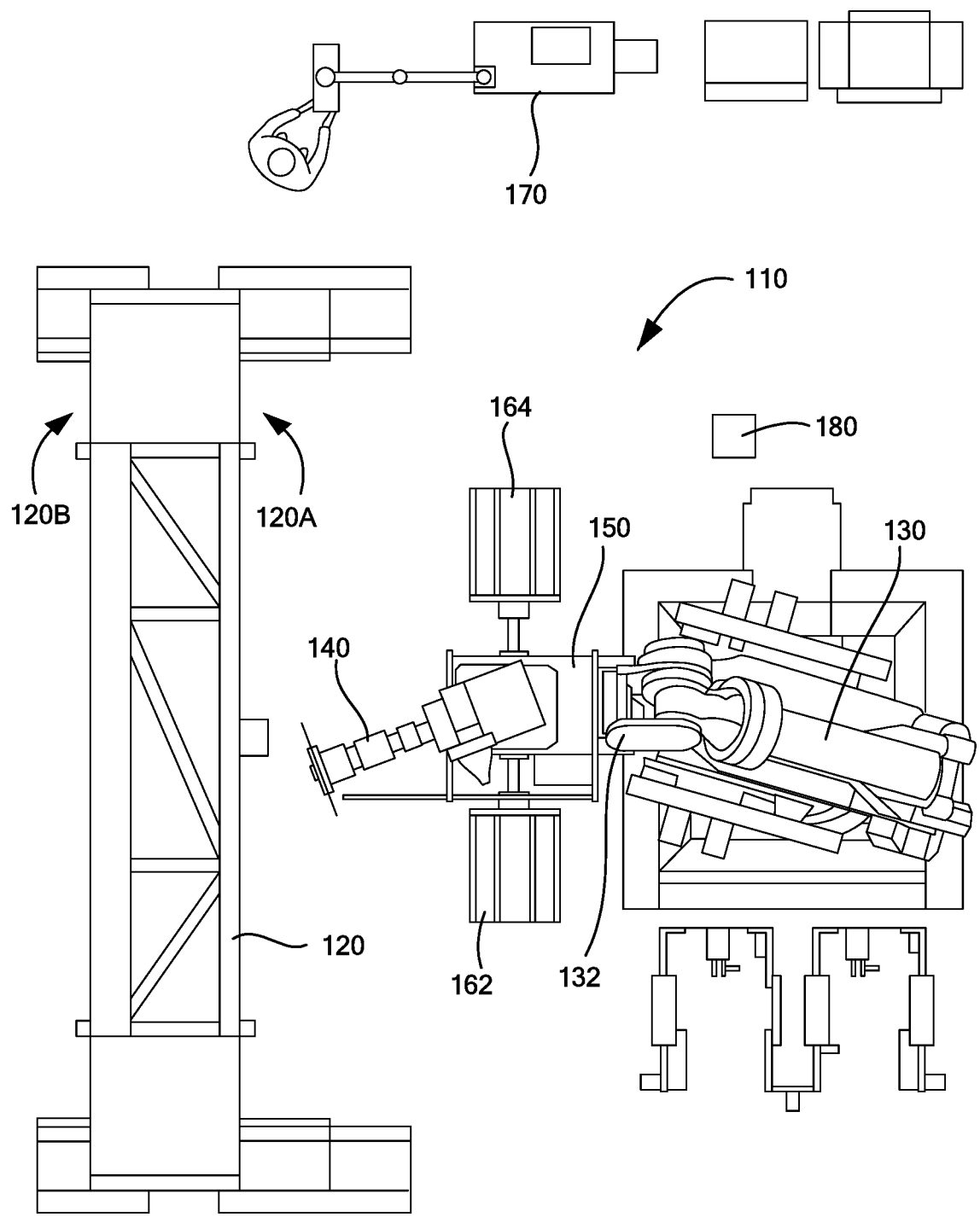
FIG. 1D is a planar top view of the automated assembly system of FIG. 1A, according to aspects of the disclosure.

According to aspects of the disclosure, an automated assembly system is disclosed that can be used to assemble radar arrays. The automated assembly system includes two robotic devices that are integrated together and operated concurrently to install parts in a radar array chassis. The first robotic device is configured to position the second robotic device at a first location that is adjacent to the radar array chassis, from which the second robotic device is able to reach a second location in the radar array chassis. The second robotic device is configured to install a part at the second location in the radar array chassis after the second robotic device has been positioned at the first location by the first robotic device. In some implementations, the first robotic device may have a larger working envelope than the second robotic device, while the second robotic device may have higher precision and/or repeatability. As a result of this arrangement, the two robotic devices can complement each other to reach a large working envelope, while maintaining the accuracy that is needed for installing parts inside the radar array chassis.

FIGS. 1A-D show an example of an automated assembly system 110, according to aspects of the disclosure. As illustrated, the automated assembly system 110 may be used to install various radar array parts inside a radar array chassis 120. The radar array chassis 120 may have a front side 120A and a rear side 120B. The automated assembly system 110 may be positioned adjacently to the front side 120A. The automated assembly system 110 may include a first robotic device 130 that is coupled to a second robotic device 140 via a cradle 150. A part stand 162 and a tool stand 164 may be mounted on the sides of the cradle 150, as shown. The part stand 162 may be configured to carry parts and other hardware that is necessary for installing the parts in the radar array chassis 120. The tool stand 164 may be configured to carry tools that are necessary for installing the parts in the radar array chassis 120.

A controller 170 may be operatively coupled to the first robotic device 130 and the second robotic device 140 and configured to synchronize the operation of the first robotic device 130 with the operation of the second robotic device 140. A part scanner 180 may be operatively coupled to the controller 170 and configured to scan parts that are being loaded onto the part stand 162 in order to prevent situations in which an incorrect part is loaded onto the part stand and installed into the radar array chassis 120 by mistake. The part scanner 180 may include a barcode scanner, an RFID scanner, and/or any other suitable type of scanning device.

In operation, an operator may input into the controller 170 a request for a particular part to be installed in the radar array chassis 120, after which the controller may bring down the part stand 162 and the tool stand 164 to a position that is aligned with the part scanner 180. The operator may then place a part on the part on the part stand 162, as well as one or more fasteners that are necessary for installing the part. In addition, the operator may place a one or more tools that are necessary for installing the part on the tool stand 164. The controller 170 may scan the part, with the part seamier 180, to determine whether the part placed on the part stand 162 is indeed the one which the operator would like to be installed in the radar array chassis 120. Afterwards, in response to confirming that the correct part has been placed on the part stand 162, the controller may transmit a first instruction to the first robotic device 130, which requests the first robotic device 130 to move the second robotic device 140 to a location L1 (shown in FIG. 1B), which is adjacent to the radar array chassis 120. Upon receiving the first command, the first robotic device 130 may execute the first command by moving the cradle 150 to the location L1. Afterwards, the first robotic device 130 may transmit to the controller 170 a confirmation that the first command has been executed successfully. In response to receiving the confirmation, the controller 170 may transmit to the second robotic device 140 a second command instructing the second robotic device 140 to install the part in the radar array chassis 120 at a second location L2 (shown in FIG. 1B). In response to receiving the second instruction, the second robotic device 140 may install the part at the second location in a well-known fashion.

According to the present example, the first robotic device 130 may include a large scale M2000 Fanuc™ robot and the second robotic device 140 may include a high-precision R2000 Fanuc™ robot, both of which are sold by the Fanuc America Corporation of Rochester Hills, Mich., United States of America. However, it will be understood that the present disclosure is not limited to any specific type of robotic device being used in the automated assembly system 110. Although in the present example both the first robotic device 130 and the second robotic device 140 are 6-axis articulated robots, the present disclosure is not limited thereto. In this regard, it will be understood that alternative implementations are possible in which the first robotic device 130 is implemented as a robotic gantry, a robotic elevator, a 2-axis articulated robot, a 4-axis articulated robot, and/or any other suitable type of robotic device. Furthermore, it will be understood that alternative implementations are possible in the second robotic device 140 is implemented as a 4-axis articulated robot, a 2-axis articulated robot, and/or any other suitable type of robotic device.

As noted above, the first robotic device 130 may have a larger working envelope that the second robotic device 140, which allows the first robotic device 130 to bring the second robotic device 140 to locations in the radar array chassis 120, which the second robotic device 140 cannot reach alone. Furthermore, the second robotic device 140 may have higher precision and/or higher repeatability that the first robotic device 130. The higher precision and/or repeatability allow the second robotic device 140 to perform tasks, which the first robotic device 130 cannot accomplish by itself. As used throughout the disclosure, the term "working envelope" may refer to the region of space which a robotic device can reach. The term "accuracy" may refer to a measure which describes how closely a robotic device can reach a commanded position. And the term "repeatability" may refer to a measure which describes how closely a robot can repeatedly return to the same position. Together, the accuracy and repeatability of a robotic device may measure the precision with which the robotic device is capable of installing parts in the radar array chassis 120.

Figure 2A:
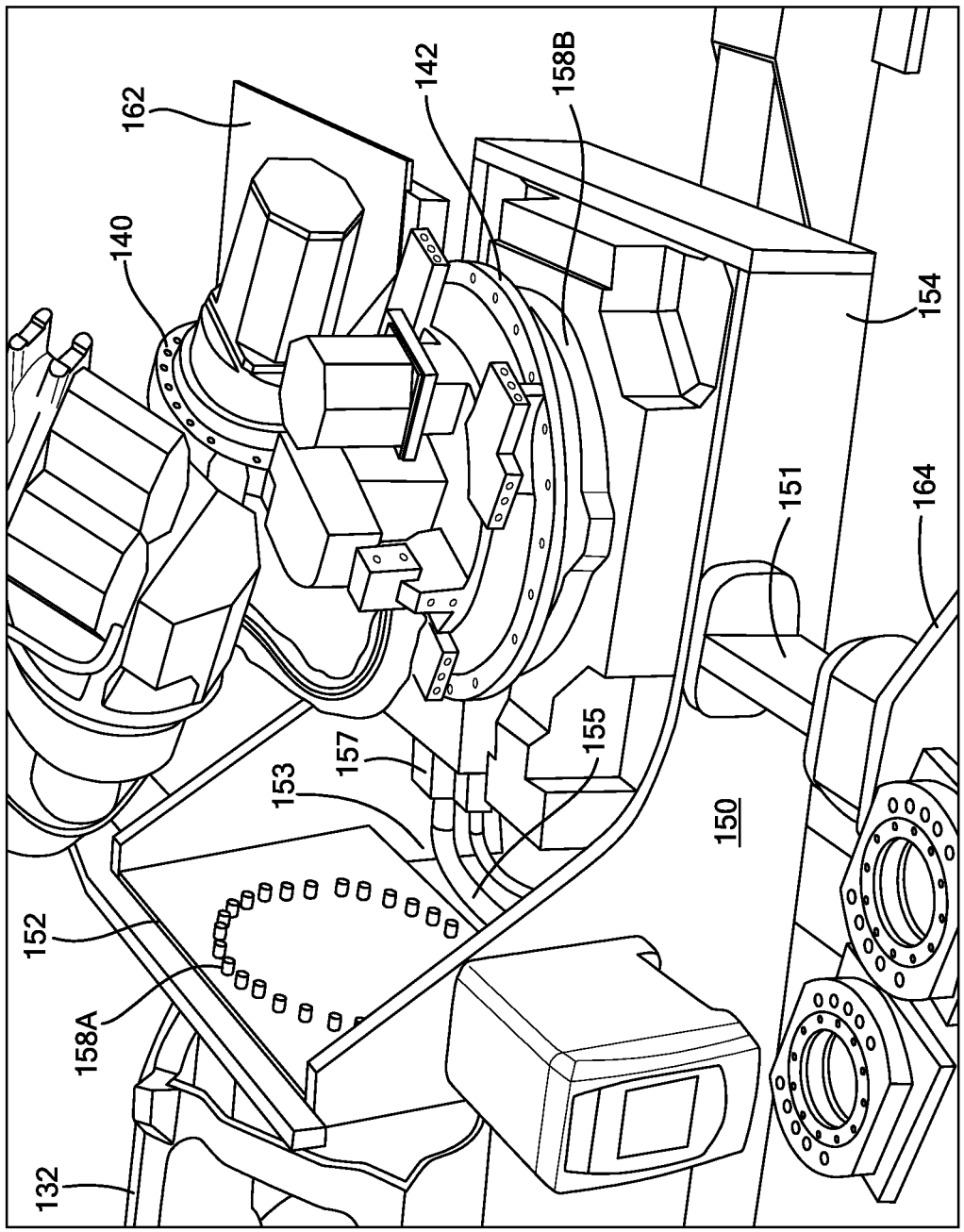
FIG. 2A is a perspective side view of a cradle that is part of the automated assembly system of FIG. 1A, according to aspects of the disclosure.

FIG. 2A shows in further detail the coupling between the first robotic device 130 and the second robotic device 140. Shown in FIG. 2A is the cradle 150, which includes a sidewall 152 and a base 154. The sidewall 152 may be coupled to the end effector 132 of the first robotic device 130 by fasteners 158A. The base 154 of the cradle 150 may be coupled to the base 142 of the second robotic device 140 by fasteners 158B. The part stand 162 may be coupled to the sides of the base 154 and arranged to extend outwardly from the base 154. In particular, each of the part stand 162 and the tool stand 164 may be coupled to the base via a respective mounting pilon 151, as shown. An opening 153 may be formed in the cradle 150 between the sidewall 152 and the base 154. A wiring harness 155 may be routed through the opening 153 and plugged into a connector 157. The connector 157 may be disposed on the base 154, and electrically coupled to various electronic components of the second robotic device 140. As can be readily appreciated, the wiring harness 155 may be used to deliver power and/or control signals to the second robotic device 140 in a well-known fashion. In some respects, routing the wiring harness 155 through the opening 153 and connecting it to a connector that is formed on the cradle 150 is advantageous because it can reduce the likelihood of damage to the electric connection between the controller 170 and the second robotic device 140.

Figure 2B:
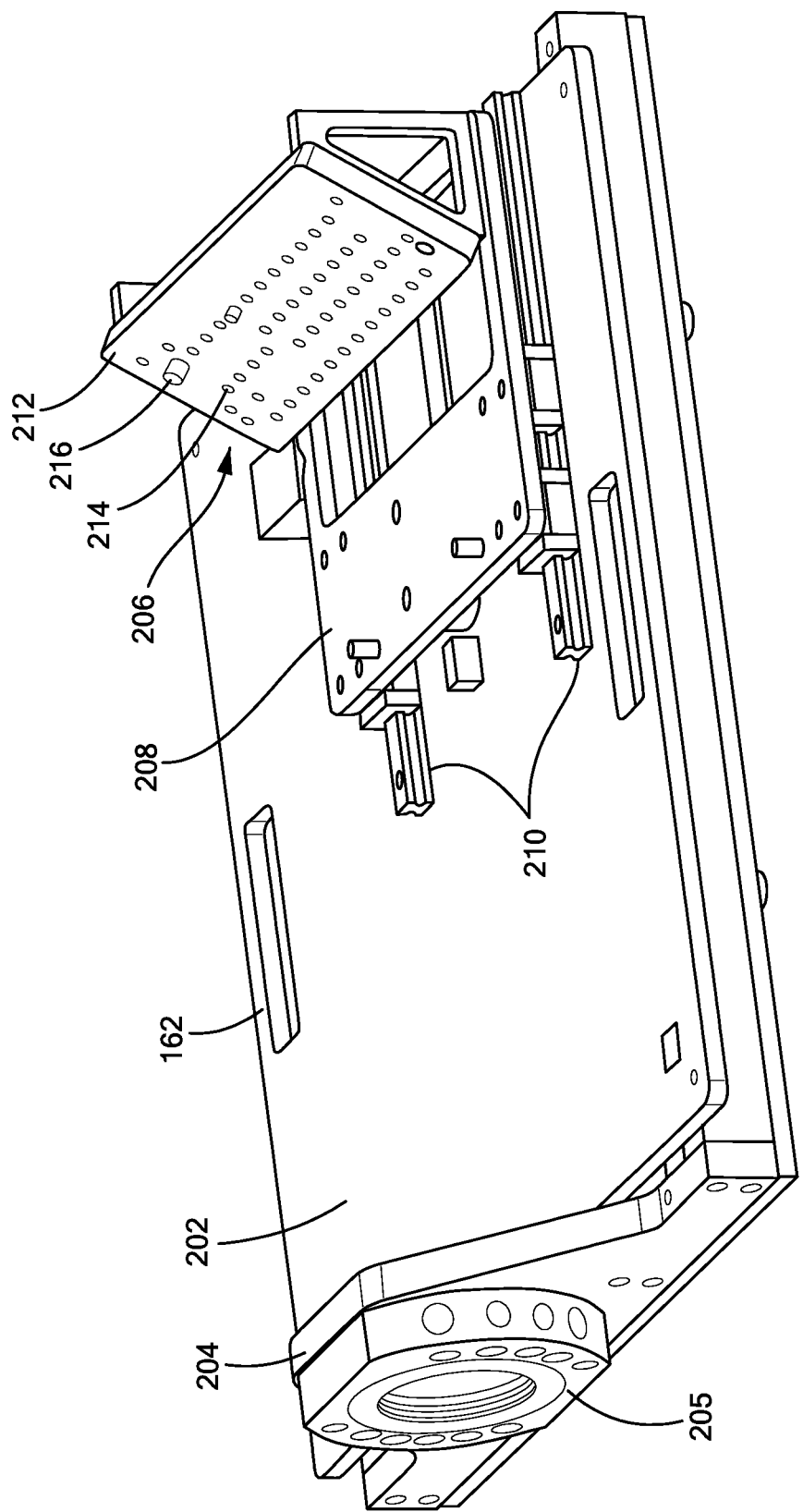
FIG. 2B is a perspective side view of a part stand that is part of the automated assembly system of FIG. 1A, according to aspects of the disclosure.

FIG. 2B shows the part stand 162 in further detail. As illustrated, the part stand 162 may include a base 202 that is coupled to a sidewall 204. A mounting hub 205 may be formed on the sidewall 204. The mounting hub 205 may be used for connecting the part stand 162 to a mounting pilon 151, which is itself attached to the cradle 150. A fastener rack 206 may be coupled to the base 202. The fastener rack 206 may include a base 208 and a side panel 212. The base 208 of the fastener rack 206 may be coupled to the base 202 of the part stand 162 via mounting rails 210, which are configured to allow adjustment of the position of the fastener rack 206, relative to the sidewall 204. The side panel 212 may include a plurality of holes 214 formed thereon, which are configured to receive fasteners 216. The side panel 212 may be arranged to face the sidewall 204 (e.g., at an angle), so as to permit the second robotic device 140 to retrieve fasteners 216 from the holes 214 for use in installing various parts inside the radar array chassis 120.

Figure 2C:
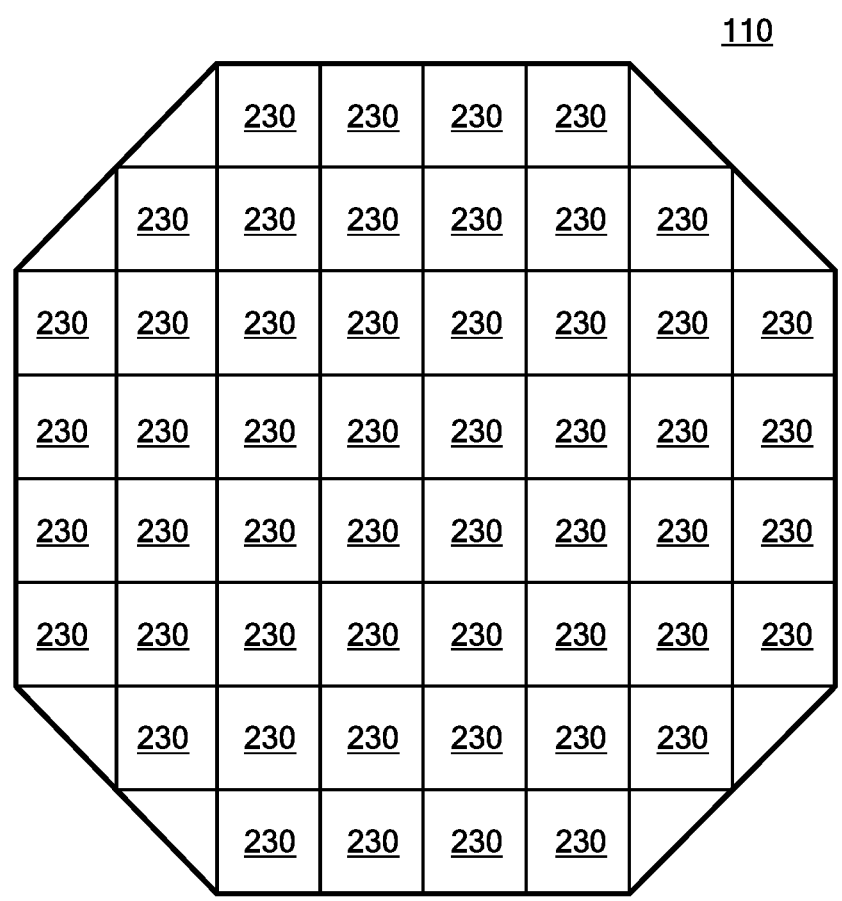
FIG. 2C is a schematic diagram of a radar array chassis, according to aspects of the disclosure.

FIG. 2C shows the radar array chassis 120 in further detail. As illustrated, the radar array chassis 120 may include a plurality of hays 230. The bays 230 may be arranged in rows and columns, Each of the bays 230 may be configured to receive a set of one or more radar array parts. Each of the radar array parts may include an antenna element, a switch, an amplifier, a circuit board, a wiring harness, and/or any other suitable type of radar array part. As used throughout the disclosure, the term "bay" shall mean "portion" or "section." It will be understood that the bays 230 may or may not be separated from one another by walls or other barriers. In some implementations, two or more of the bays 230 may receive the same set of radar array parts. Additionally or alternatively, in some implementations, two or more of the bays 230 may receive different sets of radar array parts. Stated succinctly, the present disclosure is not limited to any specific implementation of the bays 230.

Figure 3A:
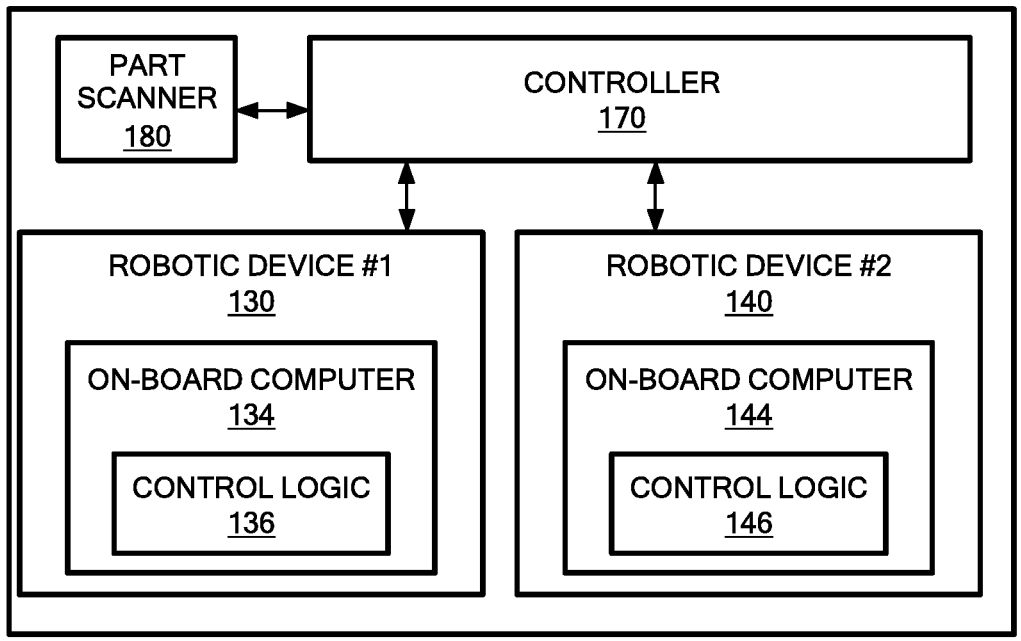
FIG. 3A is a schematic diagram of the automated assembly system of FIG. 1A, according to aspects of the disclosure.

FIG. 3A is a schematic diagram of the automated assembly system 110, according to aspects of the disclosures. As illustrated, the first robotic device 130, the second robotic device 140, and the part scanner 180 may each be operatively coupled to the controller 170. The first robotic device 130 and/or the second robotic device 140 may be coupled to the controller 170 via any suitable type of wired or wireless connection. According to the present example, each of the first robotic device 130 and the second robotic device 140 is coupled to the controller 170 via an Internet-of-things (IoT) connection, such as a Zigbee connection. However, alternative implementations are possible in which any of the first robotic device 130 and the second robotic device is coupled to the controller 170 via another type of connection, such as a local area network (LAN) connection, an Ethernet connection, an Internet connection, a Universal Serial Bus (USB) connection, for example. Similarly, the part scanner 180 may be connected to the robotic device via an IoT connection, a LAN connection, an Internet connection, and/or any other suitable type of connection.

The first robotic device 130 may include an onboard computer 134 that is configured to execute a control logic 136. The control logic 136 may be implemented in software, in hardware, or as a combination of software and hardware. The control logic 136 may be configured to receive first commands from the controller 170 and execute those commands. Each of first commands may include an indication of a location L1 where the second robotic device 140 has to be positioned in order to be able to reach a location L2 in the radar array chassis. As noted above, the location L2 may be where a particular part is required to be installed. Executing any of the first commands by the control logic 136 may include causing the first robotic device 130 to move the cradle 150 to the location L1. In this regard, the control logic 136 may specify the actions that have to be performed by various actuators in the first robotic device 130 in order to move the cradle 150 to the location L1.

The location L1 in any of the first commands may be specified directly or indirectly. When the location L1 is specified directly, any of the first commands may include coordinates corresponding to the location L1. When the location L1 is specified indirectly, any of the first commands may include the row number and the column number corresponding to a given one of the bays 230 where a particular part is requested to be installed. In such implementations, the control logic 136 may process the row and column numbers to determine the coordinates of the location where the cradle 150 has to be positioned in order for second robotic device to be able to install the part in the given bay 230. Alternatively, when the location L1 is specified indirectly, any of the first commands may include a part identifier corresponding to a part that is desired to be installed in the radar array chassis 120, In such implementations, the control logic 136 may process the part identifier to determine at least one of (i) a given location L2 in the radar array chassis Where the part has to be installed, and (ii) the coordinates of the location L1 where the cradle 150 has to be positioned in order for second robotic device to be able to reach the location L2. In instances in which the location L1 is specified indirectly, the control logic 136 may determine the given location L2 by using a table (e.g., see data structure 450 in FIG. 4C, etc.) that maps identifiers for different parts to the respective locations in the radar array chassis 120 where the parts have to be installed. Afterwards, the control logic 136 may determine the location L1 based on the location L2 and at least one of the dimensions of the first robotic device 130, the dimensions of the second robotic device 140, or the dimensions of the cradle 150.

The second robotic device 140 may include an onboard computer 144 that is configured to execute a control logic 146. The control logic 146 may be implemented in software, in hardware, or as a combination of software and hardware. The control logic 146 may be configured to receive second commands from the controller 170 and execute those commands, Each of the second commands may include an indication of a location L2 where a particular part has to be installed. Executing any of the second commands by the control logic 146 may include causing the second robotic device 140 to install a part at the location L2. In this regard, the control logic 146 may specify the actions that have to be performed by various actuators in the second robotic device 140 in order for the second robotic device 140 to install the part in the radar array chassis.

The location L2 in any of the second commands may be specified directly or indirectly. When the location L2 is specified directly, any of the second commands may include coordinates corresponding to the location L2. When the location L2 is specified indirectly, any of the second commands may include the row number and the column number corresponding to a given one of the bays 230 where a particular part is requested to be installed. In such implementations, the control logic 146 may process the row and column numbers to determine the coordinates of the location L2 in the radar array chassis where the part has to be installed. Alternatively, when the location L2 is specified indirectly, any of the second commands may include a part identifier corresponding to a part that is desired to be installed in the radar array chassis 120. In such implementations, the control logic 146 may process the part identifier to determine the location L2 in the radar array chassis 120 where the part is required to be installed. In some implementations, the control logic 146 may determine the given location L2 by using a table (e.g., see data structure 450 in FIG. 4C, etc.) that maps identifiers for different parts to the respective locations in the radar array chassis 120 where the parts have to be installed.

Figure 3B:
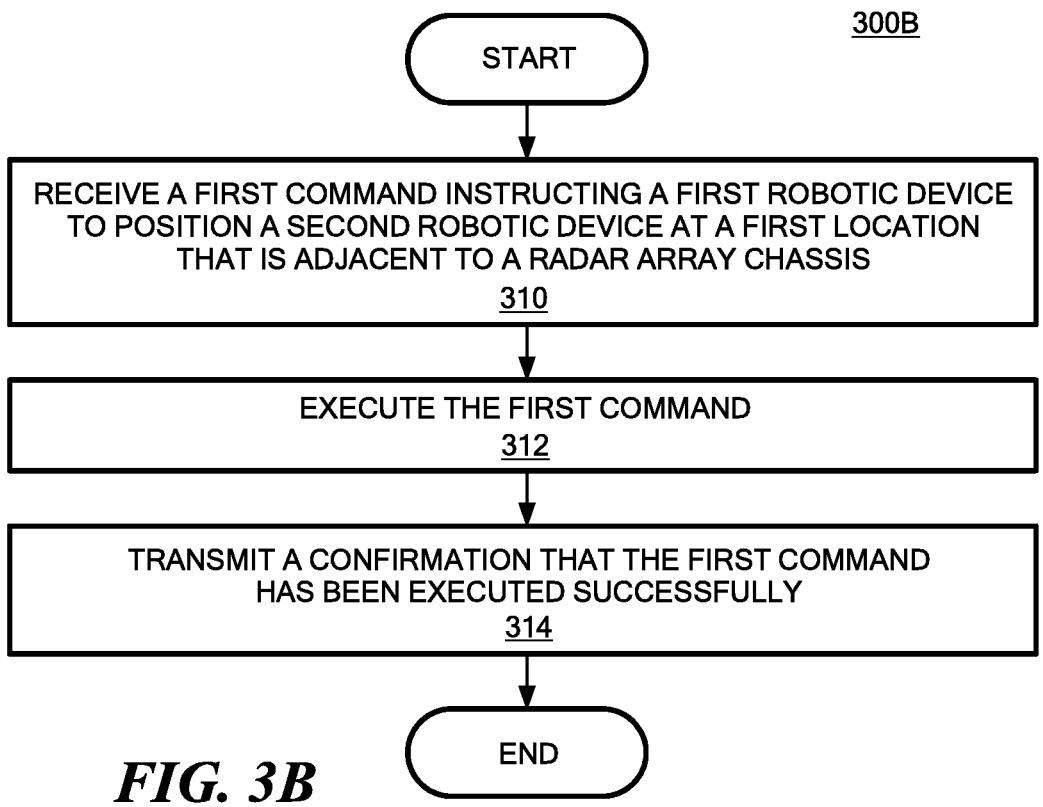
FIG. 3B is a flowchart of an example of a process that is performed by a first robotic device that is part of the automated assembly system of FIG. 1A, according to aspects of the disclosure.

FIG. 3B is a flowchart of an example of a process 300B that is performed by the first robotic device 130. At step 310, the first robotic device receives from the controller 170 a first command instructing the first robotic device 130 to position the second robotic device 140 at a location L1, At step 312, the first robotic device 130 executes the first command by moving the cradle 150 to the location L1. At step 314, the first robotic device 130 transmits to the controller a confirmation that the first command has been executed.

According to aspects of the disclosure, the first command may include any number, string, or alphanumerical string, which, when received by the onboard computer 134 of the first robotic device 130, causes the first robotic device 130 to move the cradle 150 to the location L1 According to aspects of the disclosure, executing the first command may include identifying the location L1 based on the first command, and actuating one or more actuators in the first robotic device 130 to deliver the cradle 150 to the location L1. In some implementations, identifying the location L1 may include retrieving coordinates corresponding to the location L1 from the first command. Additionally or alternatively, in some implementations, identifying the location L1 may include processing information (provided in the first command) that indirectly specifies the location L1 in order to determine the coordinates of the location L1. As noted above, the information that indirectly specifies the location L1 may include at least one of: (i) an indication of a location L2 in the radar array chassis 120 where a particular part is required to be installed (e.g., an identifier of a bay 230) or (ii) an identifier corresponding to the part.

Figure 3C:
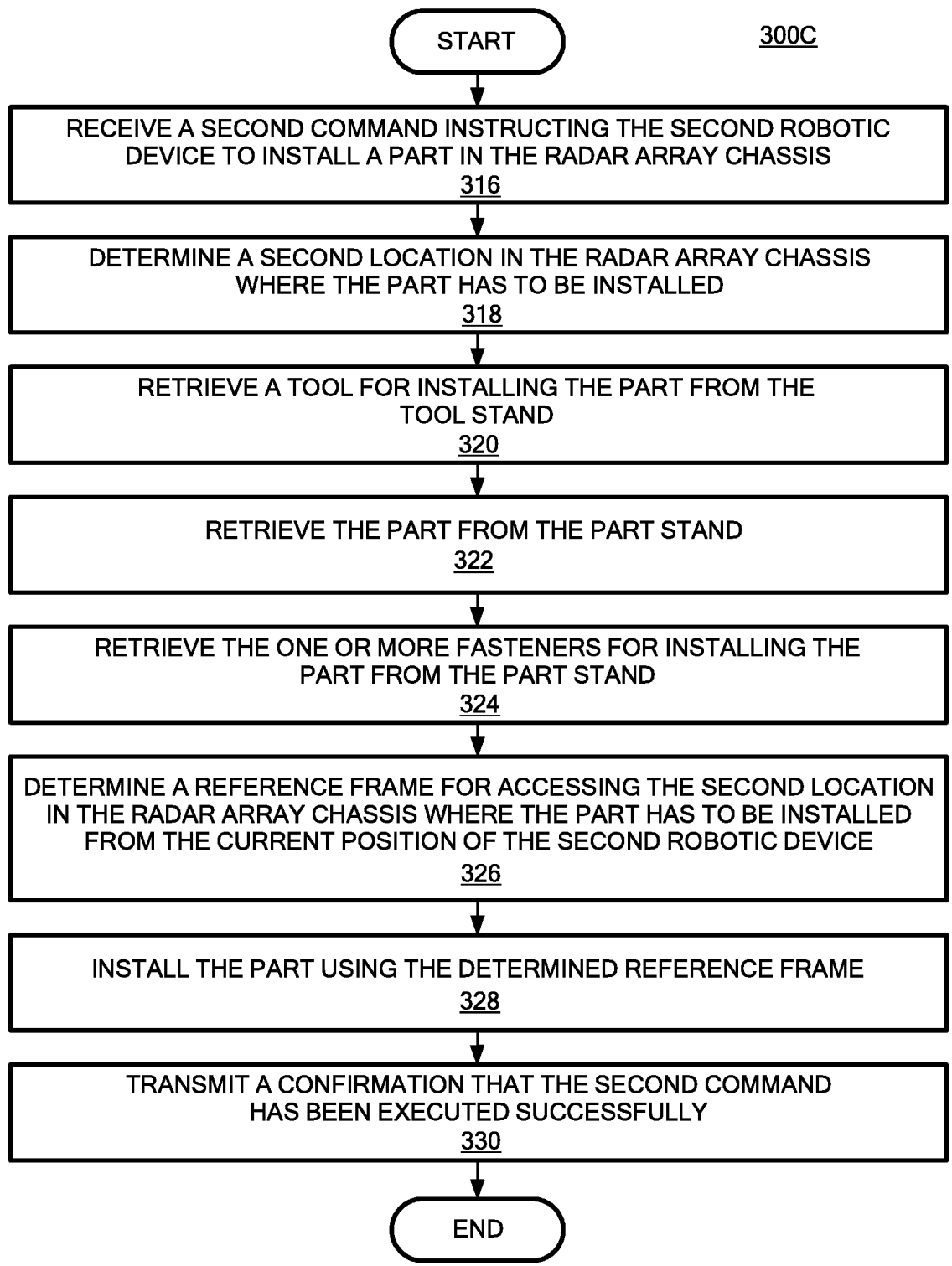
FIG. 3C is a flowchart of an example of a process that is performed by a second robotic device that is part of the automated assembly system of FIG. 1A, according to aspects of the disclosure.

FIG. 3C is a flowchart of an example of a process 300C that is performed by the second robotic device 140. The process 300C is provided as an example only. At least some of the steps in the process 300C can be performed concurrently, in a different order, or altogether omitted.

At step 316, the second robotic device 140 receives from the controller 170 a second command instructing the second robotic device 140 to install a part in the radar array chassis 120. At step 318, the second robotic device 140 determines a location L2 in the radar array chassis 120 where the part is required to be installed. At step 320, the second robotic device 140 retrieves a tool for installing the part from the tool stand 164. At step 322, the second robotic device 140 retrieves the part from the first part stand. At step 324, the second robotic device 140 retrieves the one or more fasteners from the second part stand. At step 326, the second robotic device 140 determines a reference frame for accessing the location L2 in the radar array chassis 120, where the part has to be installed. In some implementations, the reference frame may be determined based on the current location of the second robotic device 140 (e.g., the location L1), in accordance with the process 600, which is discussed further below with respect to FIG. 6. At step 328, the second robotic device 140 installs the part in the radar array chassis 120, at the location L2, by using the one or more fasteners. At step 330, the second robotic device transmits to the controller 170 a confirmation that the second command has been executed successfully.

According to aspects of the disclosure, the second command may include any number, string, or alphanumerical string, which, when received by the onboard computer 144 of the second robotic device 140, causes the second robotic device 140 to install a part associated with the second command. In some implementations, the second command may include at least one of an identifier corresponding to the part and an indication of the location L2, in the radar array chassis 120, where the part is required to be installed. In some implementations, identifying the location L2 (at step 318) may include retrieving from the second command coordinates corresponding to the location L2. Additionally or alternatively, identifying the location L2 may include processing information (provided in the second command) that indirectly specifies the location L2 in order to determine the coordinates of the location L2. As noted above, the information that indirectly specifies the location L2 may include at least one of: (i) an identifier corresponding to one of the bays 230 where a part is required to be installed or (ii) an identifier corresponding to the part.

Figure 4A:
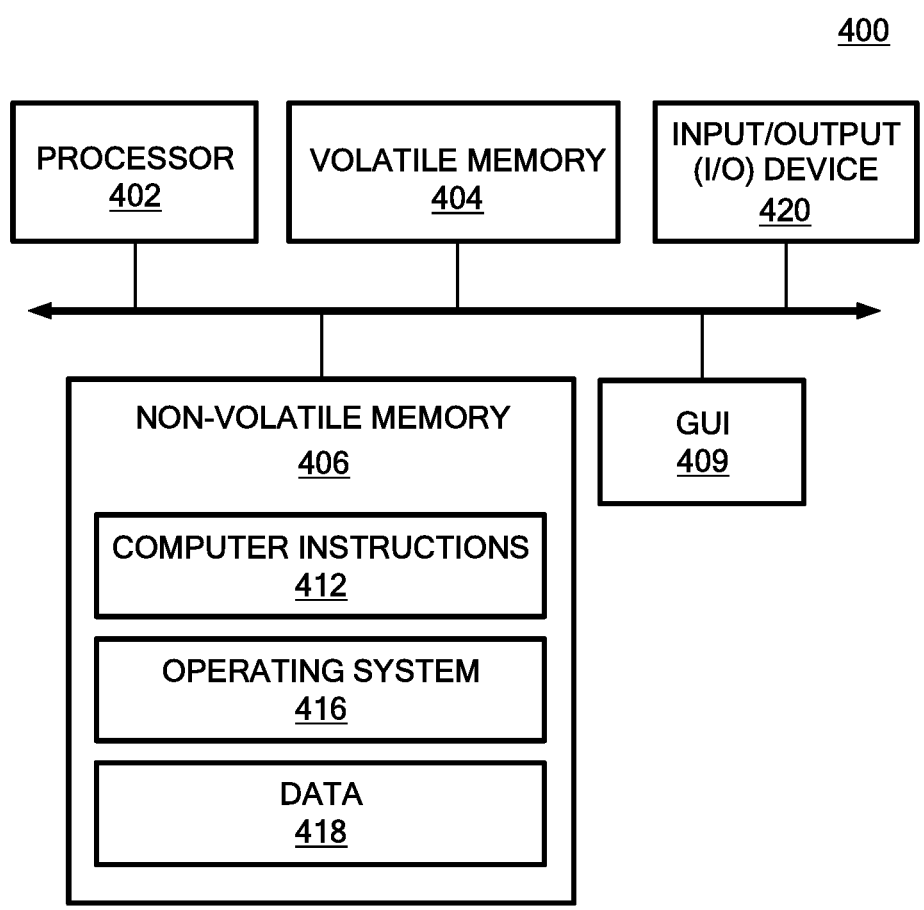
FIG. 4A is a diagram of an example of a computing device, according to aspects of the disclosure.

FIG. 4A is a diagram of a computing device 400 that can be used to implement the controller 170, according to aspects of the disclosure. Computing device 400 may include processor 402 (e.g., a general-purpose processor, an application-specific integrated circuit (ASIC), a field-programmable gate array (FPGA), etc.), volatile memory 404 (e.g., RAM), non-volatile memory 406 (e.g., a hard disk drive, a solid state drive such as a flash drive, a hybrid magnetic and solid state drive, etc.), graphical user interface (GUI) 409 (e.g., a touchscreen, a display, and so forth) and input/output (I/O) device 420 (e.g., a mouse, a keyboard, etc.). Non-volatile memory 406 stores computer instructions 412, an operating system 416 and data 418 such that, for example, the computer instructions 412 are executed by the processor 402 out of volatile memory 404. Program code may be applied to data entered using an input device of GUI 409 or received from device 420.

Figure 4B:
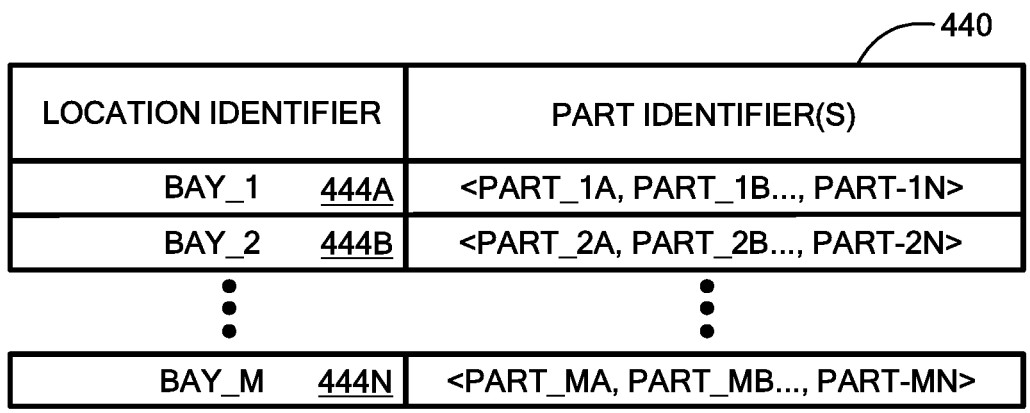
FIG. 4B is a diagram of an example of a data structure, according to aspects of the disclosure.
Figure 4C:
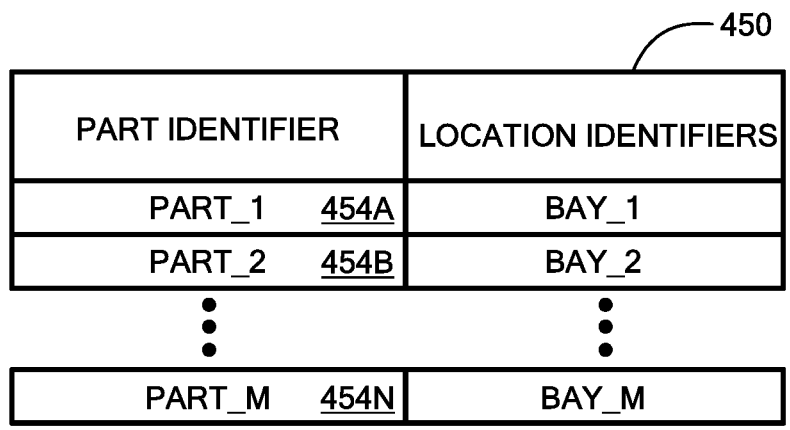
FIG. 4C is a diagram of an example of a data structure, according to aspects of the disclosure.

FIG. 4B is a diagram of an example of a data structure 440, according to aspects of the disclosure. The data structure 440 may be stored in one or more of the memory 406 of the computing device 400, the memory of the onboard computer 134 of the first robotic device 130, and the memory of the onboard computer 144 of the second robotic device 140. The data structure 440 may include a plurality of entries 444. Each entry 444 may include a location identifier and identifiers of one or more parts that are required to be installed at the location corresponding to the location identifier. According to the present example, each location identifier identifies one of the bays 230. However, alternative implementations are possible in which another type of location identifier is used. As can be readily appreciated, the data structure 440 may be used to identify one or more parts that need to be installed in the radar array chassis 120, when the one or more parts are not directly identified in user input received at the controller 170 and/or a second command that is received at the second robotic device 140, FIG. 4C is a diagram of an example of a data structure 450, according to aspects of the disclosure. The data structure 450 may be stored in one or more of the memory 406 of the computing device 400, the memory of the onboard computer 134 of the first robotic device 130, and the memory of the onboard computer 144 of the second robotic device 140. The data structure 450 may include a plurality of entries 454. Each entry 454 may include a location identifier and a corresponding part identifier. According to the present example, each location identifier identifies one of the bays 230. However, alternative implementations are possible in which another type of location identifier is used. As can be readily appreciated, the data structure 450 may be used to identify the location in the radar array chassis 120 where a particular part needs to be installed, when the location is not directly identified in user input received at the controller 170 and/or a second command that is received at the second robotic device 140.

Figure 5A:
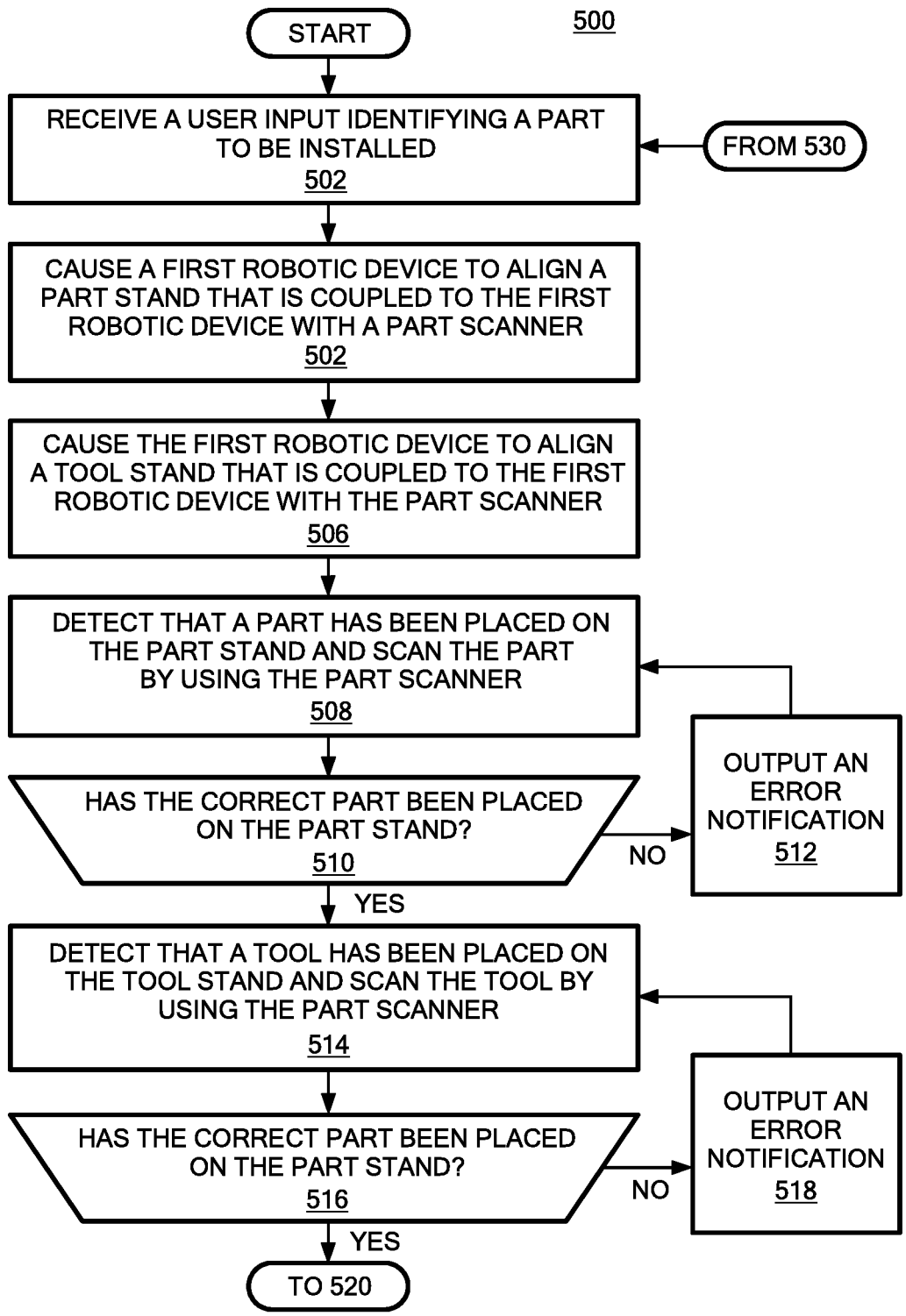
FIG. 5A is a flowchart of an example of a process that is performed by a controller that is part of the automated assembly system of FIG. 1A, according to aspects of the disclosure.
Figure 5B:
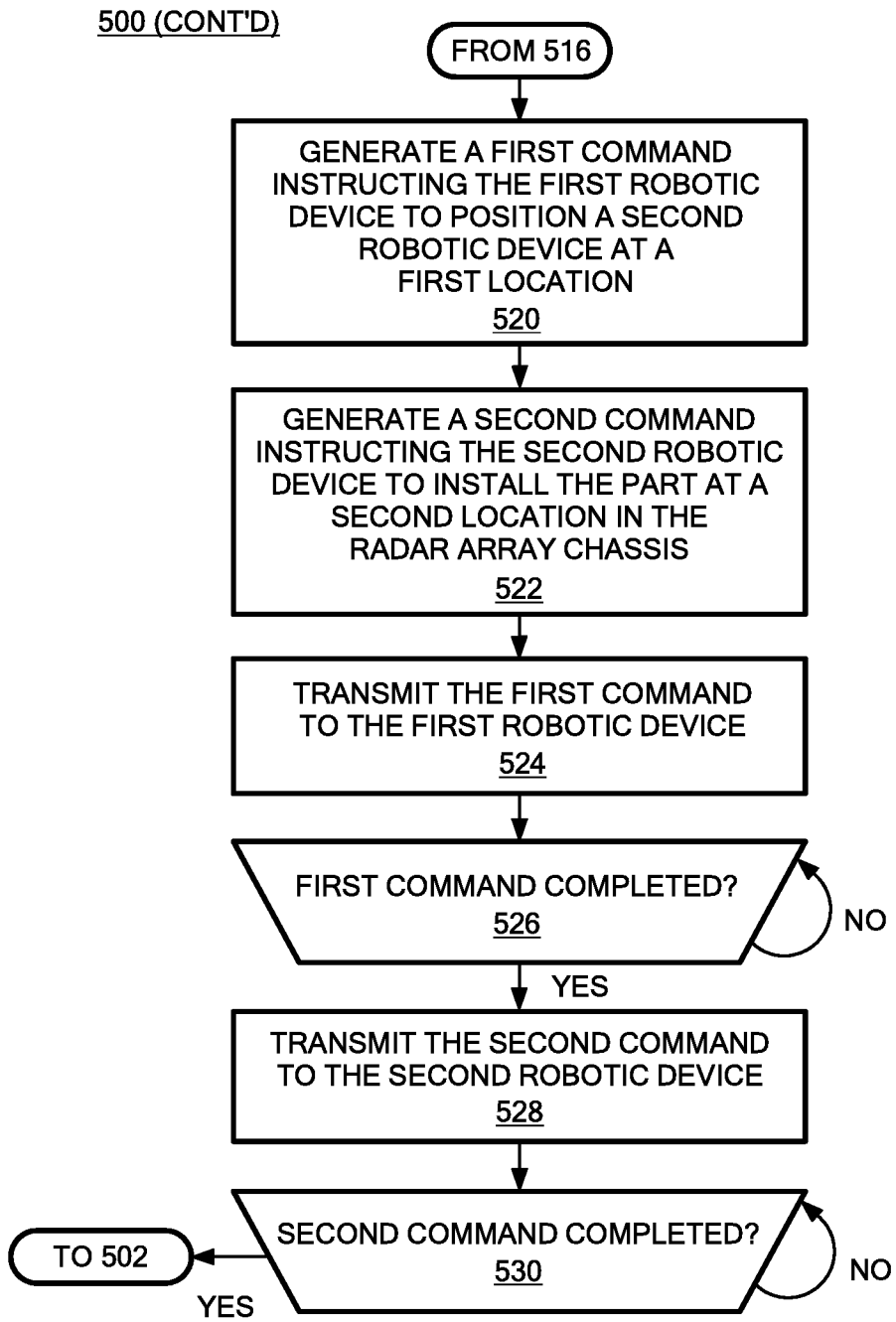
FIG. 5B is a flowchart of an example of a process that is performed by a controller that is part of the automated assembly system of FIG. 1A, according to aspects of the disclosure.

FIGS. 5A-B show an example of a process 500 that is performed by the controller 170, according to aspects of the disclosure. The process 500 is provided as an example only. At least some of the steps in the process 500 can be performed concurrently, in a different order, or altogether omitted At step 502, the controller 170 receives a user input specifying a part to be installed and/or a location in the radar array chassis 120 where the part is required to be installed. The user input may be provided via a touch screen that is part of the controller 170 and/or any other suitable type of input device, such as a keyboard, a mouse, a microphone, or a camera, for example. In some implementations, the user input may include an identifier corresponding to one of the bays 230 where the part is required to be installed. Additionally or alternatively, in some implementations, the user input may include a part identifier corresponding to the part. As discussed above with respect to FIGS. 4B-C, in some implementations, the user input may specify only one of the part identifier and bay identifier, and the other one of the part identifier and bay identifier may be resolved automatically by the controller 170 by using data structure 440 or 450. In this regard, the controller may utilize the user input to determine the part to be installed by either; (i) retrieving a part identifier corresponding to the part form the user input, or (ii) processing other information that is part of the user input in order to resolve the part identifier. Similarly, the controller may utilize the user input to determine the location where the part is required to be installed by either: (i) retrieving from the user input a location identifier corresponding to the location, or (ii) processing other information that is part of the user input in order to resolve the location identifier.

At step 504, the controller causes the first robotic device 130 to align the part stand 168 with the part scanner 180. According to the present example, aligning the part stand 162 with the part scanner 180 includes moving the part stand 162 to a position in which parts that are placed on the part stand 162 can be scanned by the part scanner 180. As is further discussed below, alighting the part stand 162 with the part scanner 180 allows any parts that are placed on the part stand 162 to be scanned with the scanner 180 to confirm that the correct parts are being placed on the part stand 162.

At step 506, the controller causes the first robotic device 130 to align the tool 164 stand with the part scanner 180. According to the present example, aligning the tool stand 164 with the part scanner 180 includes moving the tool stand 164 to a position in which parts that are placed on the tool stand 164 can be scanned by the part scanner 180. As is further discussed below, alighting the tool stand 164 with the part scanner 180 allows any tools that are placed on the tool stand 164 to be scanned with the scanner 180 to confirm that the correct tools are being placed on the tool stand 164. Although in the present example steps 506 and 504 are depicted as separate steps, those of ordinary skill in the art will readily appreciate that both the part stand 162 and the tool stand 164 can be aligned with the part code scanner in a single action.

At step 508, the controller 170 detects that a part has been placed on the part stand 162 and scans the part with the part scanner 108. Scanning the part may include reading a barcode that is printed on the part or reading an RFID tag that is provided on the part. As a result of the scan, the controller 170 obtains an identifier corresponding to the part.

At step 510, the controller 170 determines whether the part that is placed on the part stand is the same as the part specified by the user input. The determination may be made based on the identifier that is obtained as a result of the scan performed at step 506. If the part is the same, the process 500 proceeds to step 514. Otherwise, if the part that is placed on the part stand does not match the part specified by the user input, the process 500 proceeds to step 512.

At step 512, the controller 170 outputs an error notification. The error notification may include an audible notification, a visual notification, and/or any other suitable type of notification that can alert the operator that an incorrect part has been placed on the part stand 162. After the error notification is output, the operator may remove the incorrect part from the part stand 162.

At step 514, the controller 170 detects that a tool has been placed on the tool stand 164 and scans the tool with part scanner 180. Scanning the tool may include reading a barcode that is printed on the part or reading an RFID tag that is provided on the tool. As a result of the scan, the controller 170 obtains an identifier corresponding to the tool.

At step 516, the controller 170 determines whether the tool that is placed on the tool stand is the correct tool for installing the part specified by the user input. The determination may be made based on the identifier that is obtained as a result of the scan performed at step 514. If the tool is correct, the process 500 proceeds to step 520. Otherwise, if the wrong tool has been placed on the tool stand 164, the process 500 proceeds to step 518.

At step 518, the controller 170 outputs an error notification. The error notification may include an audible notification, a visual notification, and/or any other suitable type of notification that can alert the operator that an incorrect tool has been placed on the tool stand 164. After the error notification is output, the operator may remove the incorrect part from the tool stand 164.

At step 520, the controller 170 generates a first command instructing the first robotic device 130 to position the second robotic device 140 at a location L1, As noted above, the location L1 may include a location from which the second robotic device 140 may reach a location L2, where the part specified by the user input is required to be installed. In some implementations, the first command may identify the location L1 directly or indirectly. For example, when the location L1 is identified directly, the first command may include coordinates corresponding to the location L1. On the other hand, when the location L1 is identified indirectly, the first command may include other information that can be used by the first robotic device 130 to determine the coordinates of the location L1. Such information may include one or more of: (i) the row number of the bay 230 where the part is required to be installed, (ii) the column number of the bay 230 where the part is required to be installed, (iii) any indication of the location L2 in the radar array chassis 120 where the part is required to be installed, (iv) an indication of the side of the radar array chassis 120 from which the part is required to be installed (e.g., the front side 120A or the rear side 120B), (v) an identifier corresponding to the part, and/or any other suitable information.

At step 522, the controller 170 generates a second command instructing the second robotic device 140 to install the part in the radar array chassis 120, at the location L2. The second command may include at least one of an identifier corresponding to the part and an indication of the location L2. The second command may identify the part either directly or indirectly. When the part is identified directly, the second command may include a serial number corresponding to the part and/or another similar identifier. When the part is identified indirectly, the second command may include any suitable information that can be used by the second robotic device 140 to identify the part. For example, such information may include an indication of the location where the part is required to be installed, etc. The second command may identify the location L2 either directly or indirectly. When the location L2 is identified directly, the second command may include coordinates corresponding to the location. On the other hand, when the location L2 is identified indirectly, the second command may include any other suitable type of information that can be used by the second robotic device 140 to determine the coordinates of the location L2. Such information may include one or more of: (i) the row number of the bay 230 where the part is required to be installed, (ii) the column number of the bay 230 where the part is required to be installed, (iii) any indication of the location L1, (iv) an indication of the side of the radar array chassis 120 from which the part is required to be installed, (v) an identifier corresponding to the part, and/or any other suitable information.

At step 524, the controller 170 transmits the first command to the first robotic device 130. At step 526, the controller 170 waits until it has received a confirmation from the first robotic device 130 that the first command has been completed, before proceeding to step 526, At step 528, the controller 170 transmits the second command to the second robotic device 140. At step 530, the controller 170 waits until it has received a confirmation from the second robotic device 140 that the second command has been completed, after which the process returns to step 502.

In some implementations, for safety purposes, the controller 170 may be configured to synchronize the operation of the first robotic device 130 and the second robotic device 140, such that only one of the first robotic device 130 and the second robotic device 140 is allowed to move at any given time. In this regard, the controller 170 may be configured to abstain from issuing second commands to the second robotic device 140 until it has received confirmation(s) from the first robotic device 130 indicating that all pending first commands issued to the first robotic device 130 have been completed. Similarly, the controller 170 may be configured to abstain from issuing first commands to the first robotic device 130 until it has received confirmation(s) from the second robotic device 140 indicating that all pending second commands issued to the second robotic device 140 have been completed.

Although in the present example, the user input received at step 502 requests the installation of only one part, alternative implementations are possible in which the user input requests the installation of several parts at the same time. In such implementations, all parts that are specified by the user input may be loaded onto the part stand 162 and subsequently processed as discussed with respect to steps 506-522. Although in the present example, only parts that are placed on the part stand 162 are scanned with the part scanner 180 and subsequently authenticated, alternative implementations are possible in which any fastener that is placed on the part stand 162 and/or tool that is placed on the tool stand 164 is also scanned with the part scanner 180 and subsequently authenticated. According to the present example, the phrase "coordinates of location L1" may refer to the coordinates in a coordinate system used by at least one of the first robotic device 130 and the second robotic device 140. According to the present example, the phrase "coordinates of location L2" may refer to the coordinates in a coordinate system used by at least one of the first robotic device 130 and the second robotic device 140. However, it will be understood that the present disclosure is not limited to any specific way of representing the locations L1 and L2 and/or communicating the locations L1 and L2 to the first robotic device 130 and the second robotic device 140.

Figure 6:
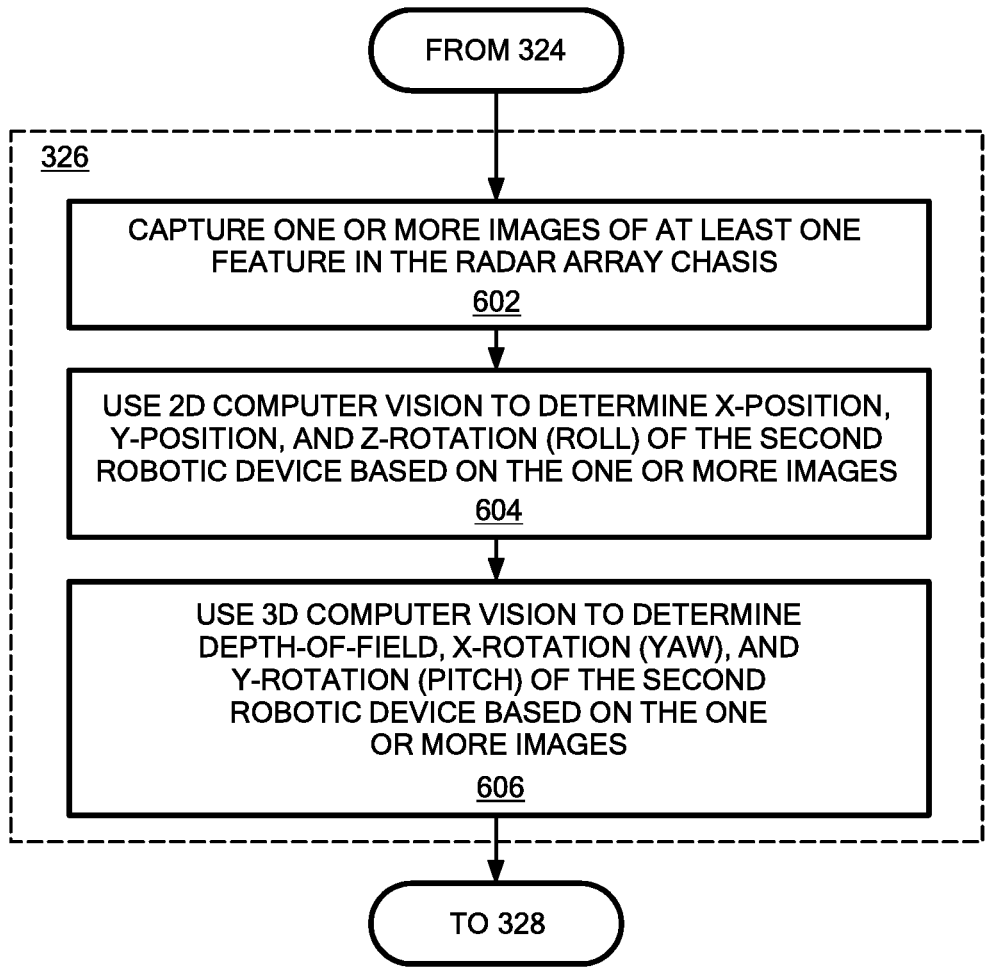
FIG. 6 is a flowchart of an example of a process, according to aspects of the disclosure.

FIG. 6 is a flowchart of an example of a process 600 for determining a reference frame for accessing a second location (L2) in the radar array chassis 120, where a part is required to be installed, as specified at step 326 of the process 3000.

At step 602, the on-board computer 144 of the second robotic device 140 captures one or more images of the radar array chassis 120 by using one or more cameras that are associated with the second robotic device 140. Each of the captured images may depict one or more predetermined features in the radar array chassis 120, which are designated for use in calibrating the second robotic device 140. At step 604, the on-board computer 144 processes the one or more images using 2D computer vision to calculate: (i) an x-position of the second robotic device 140 relative to the one or more features, a y-position of the second robotic device 140 relative to the one or more features, and (iii) a z-rotation of the second robotic device 140 relative to the one or more features. In some implementations, the calculation may be performed iteratively until an error associated with the calculation falls below a defined threshold. At step 606, the second robotic device processes the images using 3D computer vision to calculate: (iv) depth of field of the second robotic device 140, (v) an x-rotation (yaw) of the second robotic device 140 relative to the one or more features, and y-rotation (pitch) of the second robotic device 140 relative to the one or more features.

In some respects, determining the depth of field, x-position, y-position, pitch, roll, and yaw of the second robotic device 140 allows the on-board computer 144 to determine the exact position of the second robotic device 140 (or portions thereof) with respect to the second location (L2) in the radar array 120. The onboard-computer 144 may use at least some of the determined depth of field, x-position, y-position, pitch, roll, and yaw of the second robotic device 140 to determine how far one or more components of the second robotic device 140 have to travel and/or rotate in order to execute the movements that are necessary for installing the part at location L2 in the radar array chassis 120. This information may be used in generating control signals for one or more of the actuators in the second robotic device 140, In some implementations, the control signals may be calculated by using an internal coordinate system used by the second robotic device 140 in its operation.

Although the examples discussed with respect to FIGS. 1A-5 are provided in the context of assembling a radar array. It will be understood that the present disclosure is not limited thereto. Those of ordinary skill in the art would readily recognize that the automated assembly system 110 is not limited to assembling any specific type of structure. For example, the automated assembly system 110 may be used to assemble machines, electronic devices, civil engineering structures (e.g., buildings, bridges, etc.), and/or other structures, as well.

As used in this application, the word "exemplary" is used herein to mean serving as an example, instance, or illustration, Any aspect or design described herein as "exemplary" is not necessarily to be construed as preferred or advantageous over other aspects or designs. Rather, use of the word exemplary is intended to present concepts in a concrete fashion. As used throughout the disclosure, the term product may include a physical object that is being bought and sold, a service, and/or anything else that can be purchased and solved.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing and claiming the invention and are not intended to limit the claims in any way. Such terms, do not require exactness (e.g., exact perpendicularity or exact parallelism, etc.), but instead it is intended that normal tolerances and ranges apply. Similarly, unless directly stated otherwise, each numerical value and range should be interpreted as being approximate as if the word "about", "substantially" or "approximately" preceded the value of the value or range.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments have been described with respect to processes of circuits, including possible implementation as a single integrated circuit, a multi-chip module, a single card, or a multi-card circuit pack, the described embodiments are not so limited. As would be apparent to one skilled in the art, various functions of circuit elements may also be implemented as processing blocks in a software program. Such software may be employed in, for example, a digital signal processor, micro-controller, or general-purpose computer.

Some embodiments might be implemented in the form of methods and apparatuses for practicing those methods. Described embodiments might also be implemented in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the claimed invention. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

It will be further understood that various changes in the details, materials, and arrangements of the parts which have been described and illustrated in order to explain the nature of the claimed invention might be made by those skilled in the art without departing from the scope of the following claims.

The invention claimed is:

1. An automated radar assembly system, comprising:
a first robotic device coupled to a cradle, the first robotic device having a first working envelope;
a second robotic device mechanically coupled to the first robotic device via the cradle, the second robotic device having a second working envelope that is smaller than the first working envelope;
a part stand coupled to the cradle, the part stand being arranged to carry: (i) a part and (ii) one or more fasteners for installing the part in a radar array chassis; and
a controller operatively coupled to the first robotic device and the second robotic device, the controller being configured to:
cause the first robotic device to position the second robotic device at a first location relative to the radar array chassis, and
cause the second robotic device to pick up the part from the part stand and install the part at a second location in the radar array chassis,
wherein the first robotic device includes a first 6-axis robot and the second robotic device includes a second 6-axis robot.

2. The automated radar assembly system of claim 1, wherein the part stand includes a fastener rack, the fastener rack being configured to receive the one or more fasteners.

3. The automated radar assembly system of claim 1, wherein:
the controller is further configured to: receive a user input requesting the part to be installed in the chassis, identify the first location based on the user input, and identify the second location based on the user input;
causing the first robotic device to position the second robotic device at the first location includes transmitting, to the first robotic device, a first command, which when executed by the first robotic device causes the first robotic device to position the second robotic device at the first location; and
causing the second robotic device to pick up the part from the part stand and install the part at the second location includes transmitting, to the second robotic device, a second command, which when executed by the second robotic device causes the second robotic device to pick up the part from the part stand and install the part at the second location.

4. The automated radar assembly system of claim 1, further comprising a scanning device, wherein the controller is further configured to:
cause the first robotic device to position the part stand adjacent to the scanning device; and
use the scanning device to authenticate the part when the part is placed on the part stand.

5. The automated radar assembly system of claim 1, wherein:
the controller is configured to receive a confirmation from the first robotic device that the second robotic device has been positioned at the first location,
the controller is configured to wait until the confirmation is received before causing the second robotic device to pick up the part from the part stand and install the part at the second location in the radar array chassis.

6. An automated assembly system, comprising:
a first robotic device coupled to a cradle, the first robotic device having a first working envelope;
a second robotic device mechanically coupled to the first robotic device via the cradle, the second robotic device having a second working envelope that is smaller than the first working envelope;
a controller operatively coupled to the first robotic device and the second robotic device the controller being configured to:
receive a user input requesting a part to be installed in a structure under assembly,
cause the first robotic device to position the second robotic device at a first location relative to the structure under assembly, and
cause the second robotic device to install the part at a second location in the structure under assembly,
wherein the first robotic device includes a first 6-axis robot and the second robotic device includes a second 6-axis robot.

7. The automated assembly system of claim 6, a part stand coupled to the cradle of the first robotic device, the part stand being arranged to carry: (i) the part and (ii) one or more fasteners for installing the part in the structure under assembly.

8. The automated assembly system of claim 7, wherein the part stand includes a fastener rack, the fastener rack being configured to receive the one or more fasteners.

9. The automated assembly system of claim 7 further comprising a scanning device, wherein the controller is further configured to:
cause the first robotic device to position the part stand adjacent to the scanning device; and
use the scanning device to authenticate the part when the part is placed on the part stand.

10. The automated assembly system of claim 6, wherein:
the controller is further configured to identify the first location based on the user input, and identify the second location based on the user input;
causing the first robotic device to position the second robotic device at the first location includes transmitting, to the first robotic device, a first command, which when executed by the first robotic device causes the first robotic device to position the second robotic device at the first location; and
causing the second robotic device to install the part at the second location includes transmitting, to the second robotic device, a second command, which when executed by the second robotic device causes the second robotic device to install the part at the second location.

11. The automated assembly system of claim 6, wherein:
the controller is configured to receive a confirmation from the first robotic device that the second robotic device has been positioned at the first location,
the controller is configured to wait until the confirmation is received before causing the second robotic device to install the part at the second location in the structure under assembly.

12. An automated assembly system, comprising:
a first robotic device coupled to a cradle, the first robotic device having a first working envelope;
a second robotic device mechanically coupled to the first robotic device via the cradle, the second robotic device having a second working envelope that is smaller than the first working envelope;
a controller operatively coupled to the first robotic device and the second robotic device, the controller being configured to:
receive a user input requesting a part to be installed in a structure under assembly;

identify a first location where the second robotic device has to be positioned in order for the second robotic device to be able to install the part in the structure under assembly;
identify a second location in the structure under assembly where the part is to be installed;
transmit, to the first robotic device, a first command, the first command instructing the first robotic device to position the second robotic device at the first location;
receive a confirmation from the first robotic device indicating that the second robotic device has been positioned at the first location; and
transmit a second command to the second robotic device, the second command instructing the second robotic device to install the part at the second location in the structure under assembly,
    wherein the first robotic device includes a first 6-axis robot and the second robotic device includes a second 6-axis robot.

13. The automated assembly system of claim 12, further comprising a part stand coupled to the cradle, the part stand being arranged to carry the part and one or more fasteners for installing the part in the structure under assembly.

14. The automated assembly system of claim 12, wherein the controller is further configured to wait until the confirmation is received before transmitting the second command to the second robotic device.

\* \* \* \* \*